United States Patent [19]

Burns

[11] Patent Number: 5,836,542

[45] Date of Patent: Nov. 17, 1998

[54] FLYING CRAFT AND A THRUSTER ENGINE SUITABLE FOR USE IN SUCH A CRAFT

[76] Inventor: David Johnston Burns, Broomhall Castle, Menstrie, Clackmannanshire, FK11 7EA, Great Britain

[21] Appl. No.: 430,721

[22] Filed: Apr. 28, 1995

[30] Foreign Application Priority Data

Apr. 28, 1994 [GB] United Kingdom .................. 9408394

[51] Int. Cl.⁶ .................................................. B64C 39/06
[52] U.S. Cl. ...................... 244/12.2; 244/123; 244/23 C; 244/23 B; 244/74; 60/270.1; 60/257
[58] Field of Search .......................... 244/74, 12.1, 12.2, 244/12.3, 23 R, 23 C, 23 D, 23 B, 58, 36, 15, 62, 53 R; 60/270.1, 257, 258

[56] References Cited

U.S. PATENT DOCUMENTS

| | | | |
|---|---|---|---|
| 1,634,167 | 6/1927 | Wilson | 244/58 |
| 1,717,552 | 6/1929 | Dunn | 244/58 |
| 1,843,926 | 2/1932 | MacCaskie | 244/12.3 |
| 1,873,505 | 8/1932 | Stipa | 244/36 |
| 2,630,680 | 3/1953 | Goddard | 60/257 |
| 2,633,703 | 4/1953 | Tenny et al. | 60/270.1 |
| 2,679,137 | 5/1954 | Probert | 60/270.1 |
| 2,729,059 | 1/1956 | Foure et al. | 60/270.1 |
| 2,734,699 | 2/1956 | Lippisch | 244/23 B |
| 2,735,633 | 2/1956 | Manning | 60/270.1 |
| 3,013,385 | 12/1961 | Kerry et al. | 60/270.1 |
| 3,066,890 | 12/1962 | Price | 244/12.2 |
| 3,127,129 | 3/1964 | Petrie | 244/23 B |
| 3,157,373 | 11/1964 | May et al. | 244/23 B |
| 3,261,571 | 7/1966 | Pinnes | 244/74 |
| 3,279,187 | 10/1966 | Lindman | 60/258 |
| 3,514,053 | 5/1970 | Mcguinness | 244/12.2 |
| 3,811,280 | 5/1974 | Wharton et al. | 60/270.1 |
| 4,019,699 | 4/1977 | Wintersdoff | 244/36 |
| 4,023,751 | 5/1977 | Richard . | |
| 4,666,104 | 5/1987 | Kelber | 244/209 |
| 4,824,048 | 4/1989 | Kim | 244/23 C |
| 5,312,069 | 5/1994 | Bollinger et al. | 244/23 B |
| 5,337,975 | 8/1994 | Peinemann | 244/538 |

FOREIGN PATENT DOCUMENTS

| | | | |
|---|---|---|---|
| 0580696 | 6/1992 | U.S.S.R. | 244/23 C |
| 383637 | 11/1932 | United Kingdom . | |
| 554425 | 7/1943 | United Kingdom . | |
| 569998 | 6/1945 | United Kingdom . | |
| 788852 | 1/1958 | United Kingdom . | |
| 1 319 428 | 6/1973 | United Kingdom . | |
| 1 477 714 | 6/1977 | United Kingdom . | |
| 1 545 072 | 5/1979 | United Kingdom . | |
| 2227469 | 8/1990 | United Kingdom | 244/12.2 |

OTHER PUBLICATIONS

Keirsey, "Airbreathing Propulsion For Defense of the Surface Fleet" pp. 57–68, John Hopkins Tech Rep Nov. 1992.

*Primary Examiner*—Galen L. Barefoot
*Attorney, Agent, or Firm*—Reid & Priest LLP

[57] ABSTRACT

A flying craft (14) has a dish shaped body (18, 20, 21) with a convex upper surface (18) to provide lift. Engine means (1) in the form of a jet or rocket engine is housed in the body at the rear, while a duct (15) extends through the body from an air opening (15A) at the front of the craft (14) so as to direct air to the engine means (1) for example to serve as cooling and/or combustion air for the engine means. Additional thruster jets (16A, 16B) can be located on the bottom of the body for directional control. In a further embodiment (FIG. 12), an electric motor driven fan (37) is located in the duct (15) to form a ducted fan propulsion and unit for forward, slightly descending, movement of the craft (14A), while a more powerful jet or rocket engine (35) is located vertically in the craft to effect vertical ascent of the craft to an elevation where forward motion by the ducted fan propulsion unit can commence. A turbine fan driven alternator (27) can also be located in the ducting (15). A suitable rocket engine is also described (FIGS. 1 and 6).

6 Claims, 16 Drawing Sheets

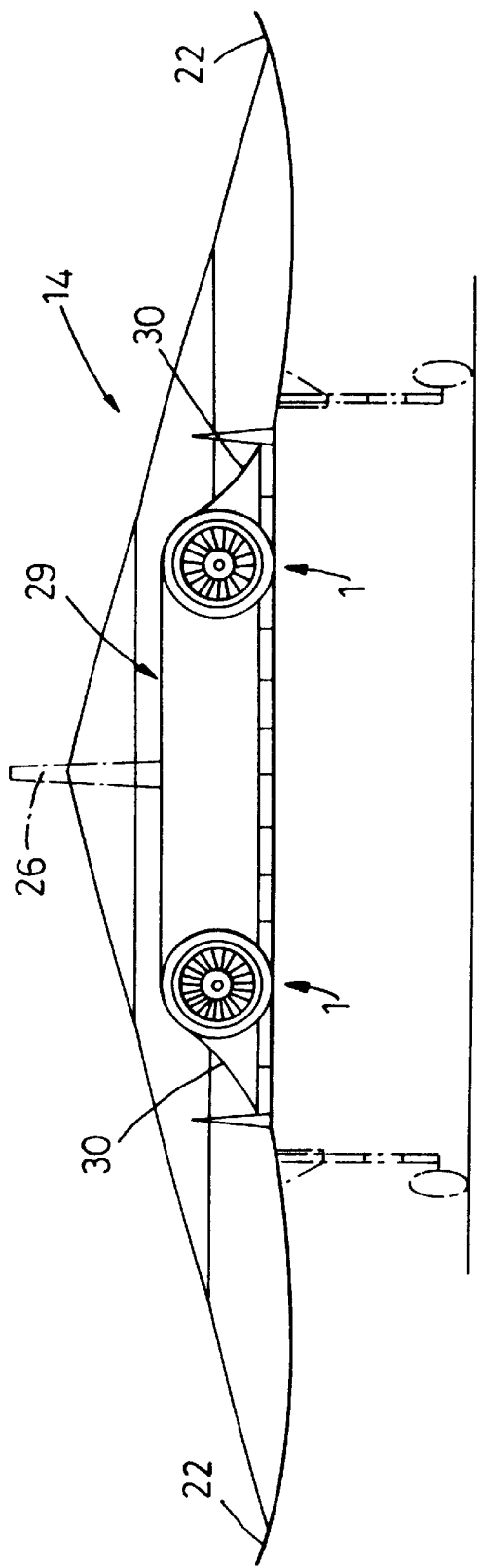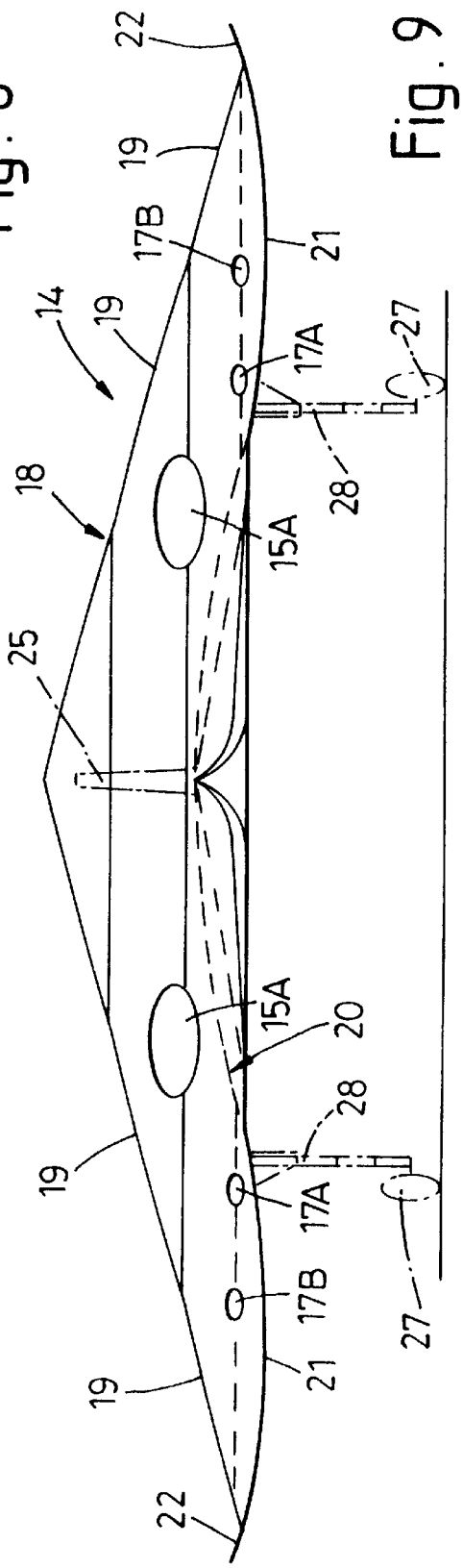

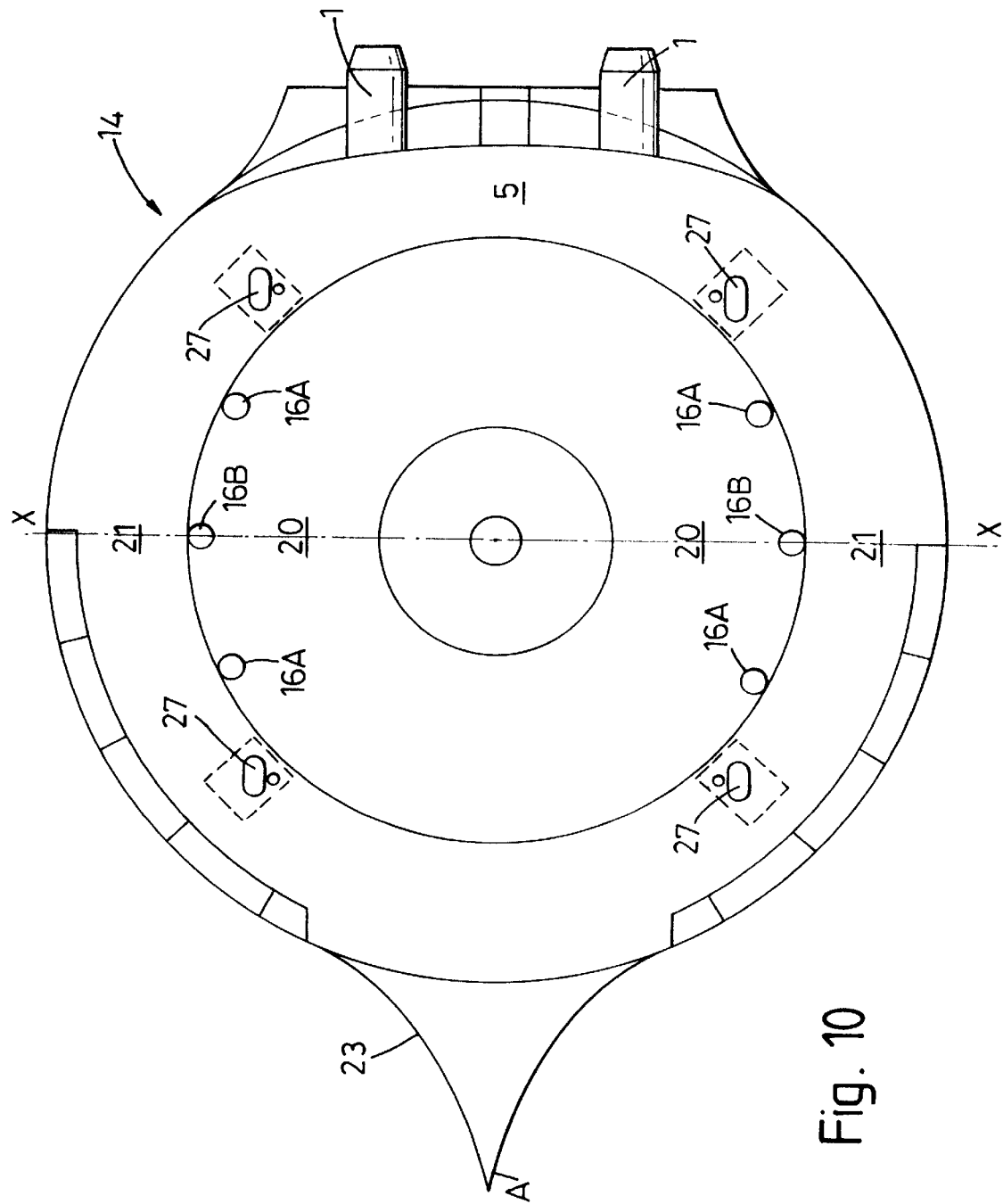

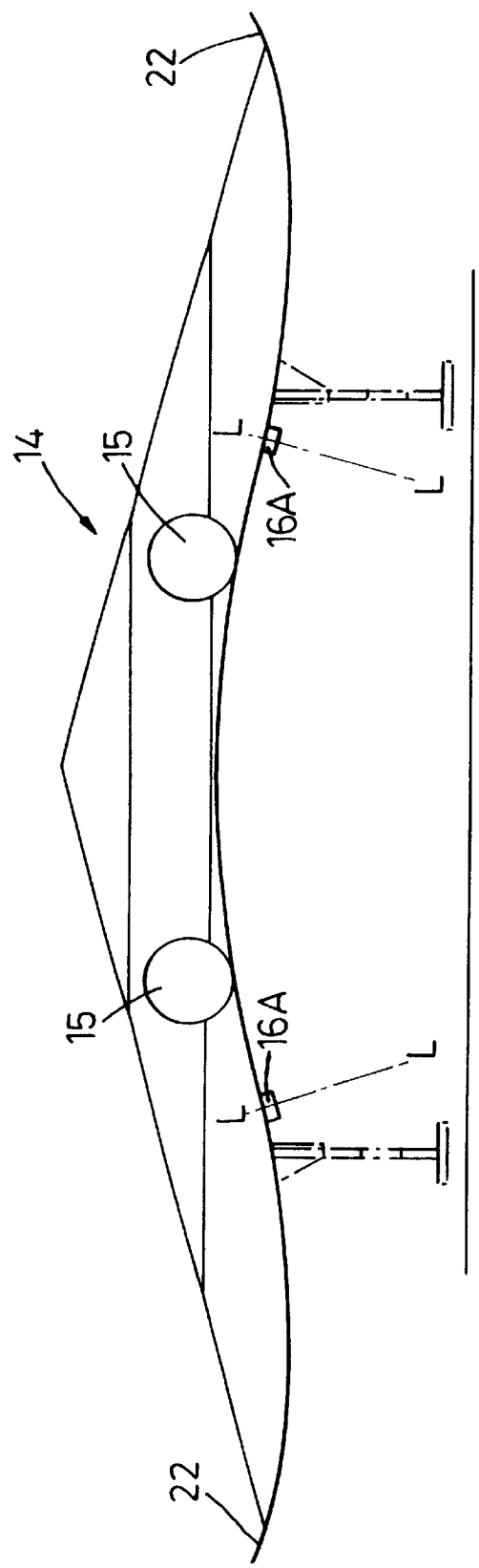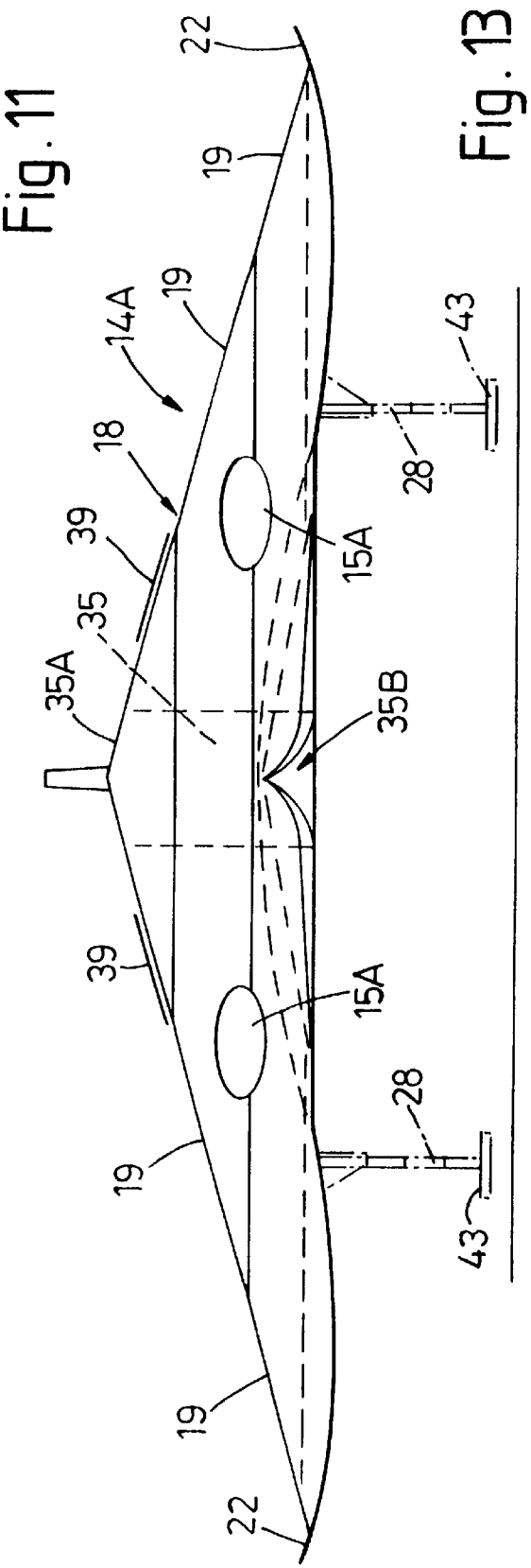

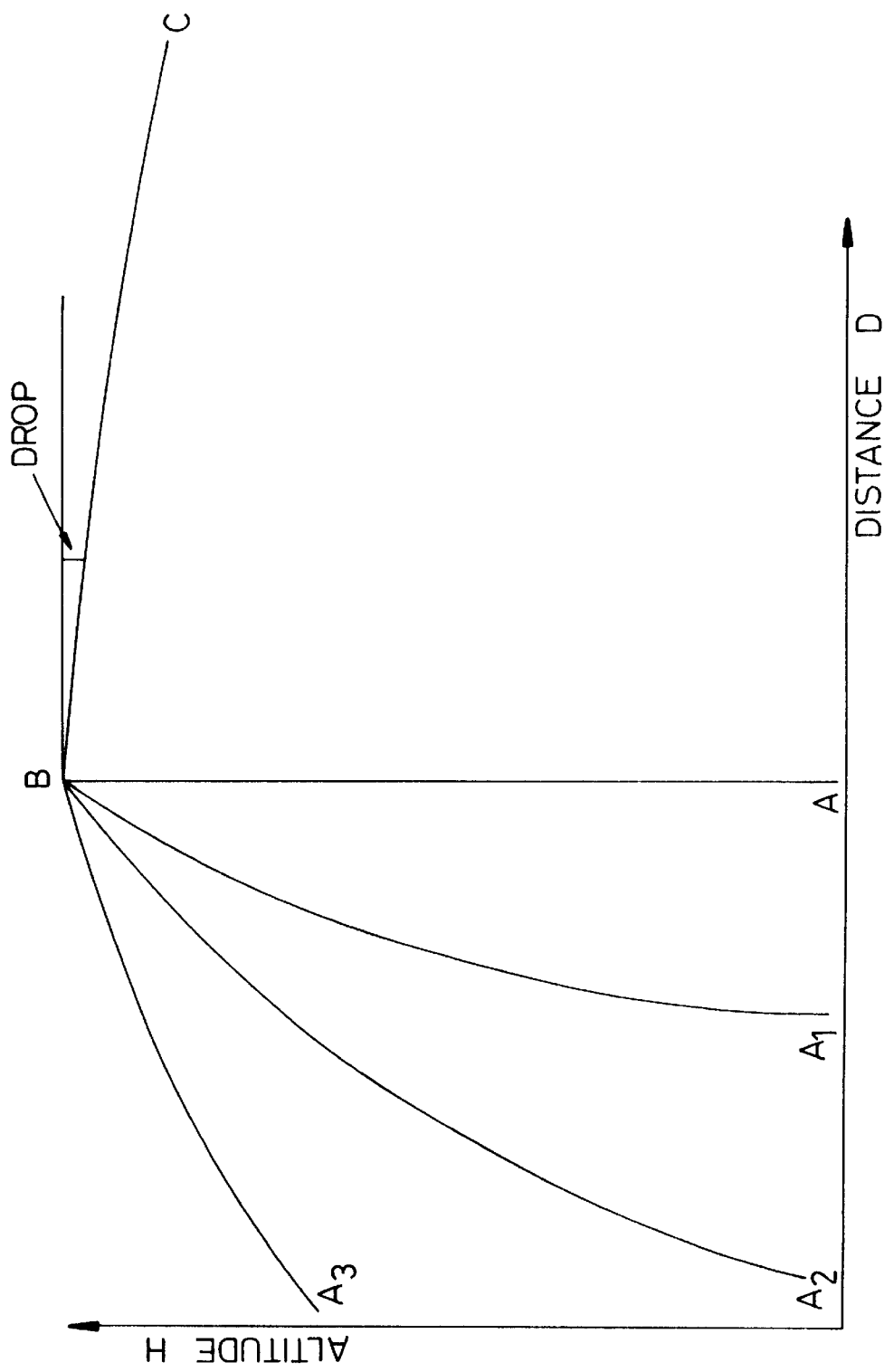

FLYING CRAFT AND A THRUSTER ENGINE SUITABLE FOR USE IN SUCH A CRAFT

The present invention relates to a flying craft and to a thruster engine which can be used to power the craft. More especially thrust in the engine is obtained by a high velocity gas jet, and in particular the engine can be of the rocket-type.

Dish-form flying craft are known and have recognised benefits in an ability to fly at particularly high speeds due to their low drag factor. They are also capable of carrying a larger number of passengers in comparison with comparable conventional (winged) aircraft. An example of such a dished flying craft is described in GB Patent specification 2 227 469 B. It is an object of the present invention to povide improvements in such a flying craft.

Also, rocket engines are well established and are especially beneficial for use in oxygen-free outer space. The rocket engine operates by burning a propellant fuel or fuels in a combustion chamber to produce via a rear nozzle a high velocity gas flow, providing the driving thrust for the engine. A common propellant is a liquid-propellant such as for example liquid-oxygen or liquid hydrogen, and rocket engines utilising a bipropellant system, i.e. two combustibles, are also known.

It is a further object of the present invention to provide a liquid-propellant rocket engine of improved performance for use in a flying craft.

According to a first aspect of the present invention, a flying craft includes a thruster engine, said thruster engine comprising means for housing adjacent first and second work zones, said casing means having a rear first delivery means for introducing a first propellant fuel into said work zone combustion in said first and second work zone, said first delivery means comprising:

(a) a first conical member having a surface and an apex, said apex facing said first work zone.

(b) a second conical member coaxial with said first conical member;

(c) duct means in said surface of said first conical member for the through flow of said first propellant fuel into said first work zone; and (d) conduit means for directing burning fuel from said work zone to said second work zone, said conduit means being formed on said second conical body, and second delivery means for directing a second medium to said second work zone for admixture with the burning fuel, the burning fuel and the medium being discharged from said rear of said casing means to constitute a thrust jet for said engine.

The present invention is also a flying craft comprising a generally dished form body providing a lift characteristic, and having a front end and a rear end, said body further having a domed shaped upper surface and a lower surface, and an air inlet located in said front part of the domed upper surface, a vertically disposed first engine means located substantially at the center of said dish shaped body to provide a vertical thrust for vertically propelling said flying craft to an elevated position, second engine means for providing propulsion power which is only sufficient to cause a forward motion of the flying craft with a slight descending path from an elevated position attained by means of the first engine means, the second engine means comprising electrically powered propulsion means for use in providing a horizontal thrust for propelling said flying craft in a forward direction from said elevated position, said electrically powered propulsion means comprising propulsion turbines and electrical drive means for driving the propulsion turbines, and air ducting located on either side of said first engine means and extending within said body from said air inlet to said rear end of said body, each of said ductings housing a said propulsion turbine whereby propulsion air is supplied to said turbine through the ducting.

Embodiments of the present invention will now be described by way of example with reference to the accompanying drawings wherein:

FIG. 5 being a sectional elevation.

FIG. 8 is a rear view of the craft of FIG. 7;

FIG. 9 is a front view of the craft;

FIG. 10 is a bottom view of the craft showing the auxiliary thruster/booster jets;

FIG. 11 is an elevational view through X—X in FIG. 10;

FIG. 13 is a front view of the flying craft of FIG. 12;

FIG. 14 is a graph showing a possible flight path achievable by the craft of FIG. 12;

Figure 1:
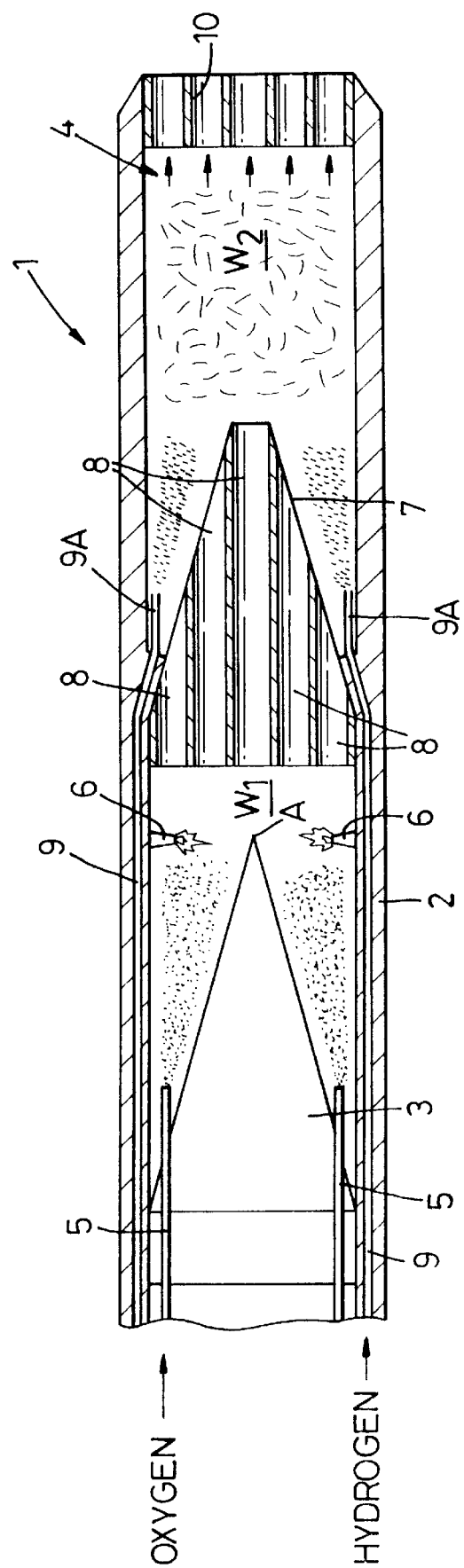
FIG. 1 shows a sectional elevation of a rocket engine according to the present invention.
Figure 2:
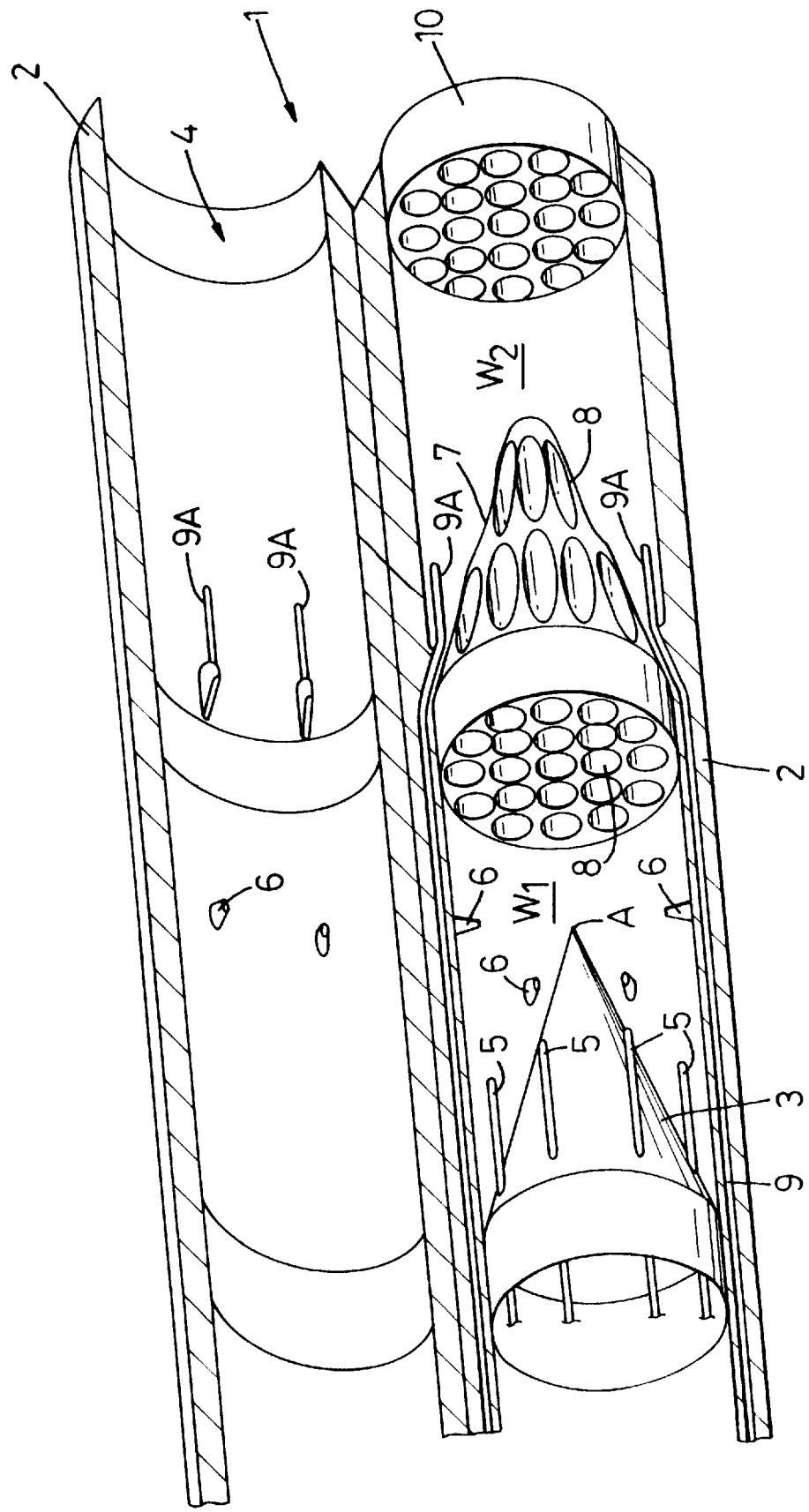
FIG. 2 shows a pictorial view of the engine of FIG. 1 with the casing "open" to better illustrate the internal components and internal arrangement.

Referring firstly to FIGS. 1 and 2, a rocket engine comprises a casing 2 preferably of a glazed finished ceramic lined form defining two internal work zones $W_1$, $W_2$. A conical member 3 is located at the inlet of the first zone $W_1$, with its apex A located toward the rear discharge end 4 of the casing 2 and carries liquid-oxygen feed pipes 5 for discharge into the zone $W_1$. A suitable storage tank (not shown) will supply to the pipes 5. The liquid-oxygen is combusted in the zone $W_1$, defining a combustion chamber, by means of igniter devices 6. At the entry to the work zone $W_2$, there is provided a further conical member 7 with its apex towards the end 4, and a plurality of axial ducts 8 are present in the member 7 for through-flow of the burning or combusted oxygen from the zone $W_1$, to the zone $W_2$. Conduits 9, shown in this example embedded in the casing 2 feed a second medium, in this case liquid-hydrogen, to the work zone $W_2$, the hydrogen being discharged via nozzles 9A at the periphery of the conical member 7. Consequently the burning oxygen mixes with the hydrogen in the work zone $W_2$ to produce very high temperature burning gases resulting in a high velocity thruster jet discharging at the rear end of the casing 2 via a multi-orificed nozzle device 10.

The liquid hydrogen will be stored in a suitable storage tank (not shown).

Figure 6:
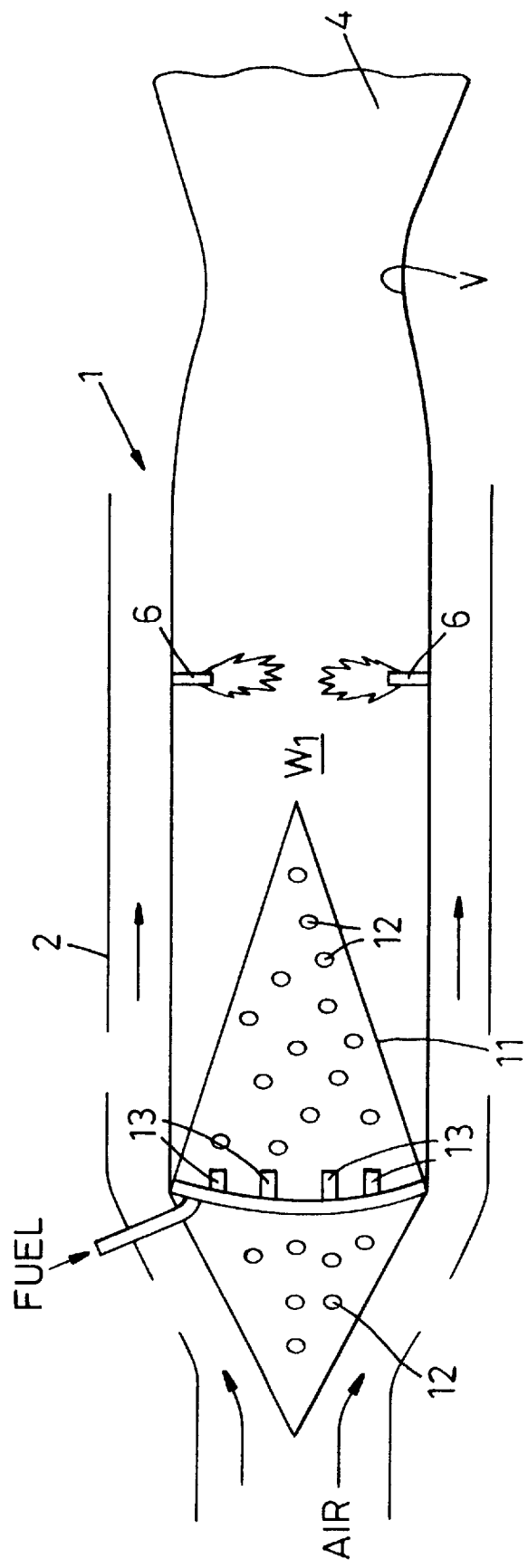
FIG. 6 shows a modified engine in accordance with the present invention.

FIG. 6 shows a further engine wherein atmospheric air is supplied for the combustion process, and the casing 2 houses a double conical member 11 including through-openings 12 for flow of the air to the combustion zone $W_1$ provided with igniters 6. Combustible fuel is pumped to the zone $W_1$, via nozzles 13. The rear 4 of the casing 2 constitutes a ventor throat V. The air also serves to cool the engine by flowing along the outer surface of the zone $W_1$ as shown.

Figure 3:
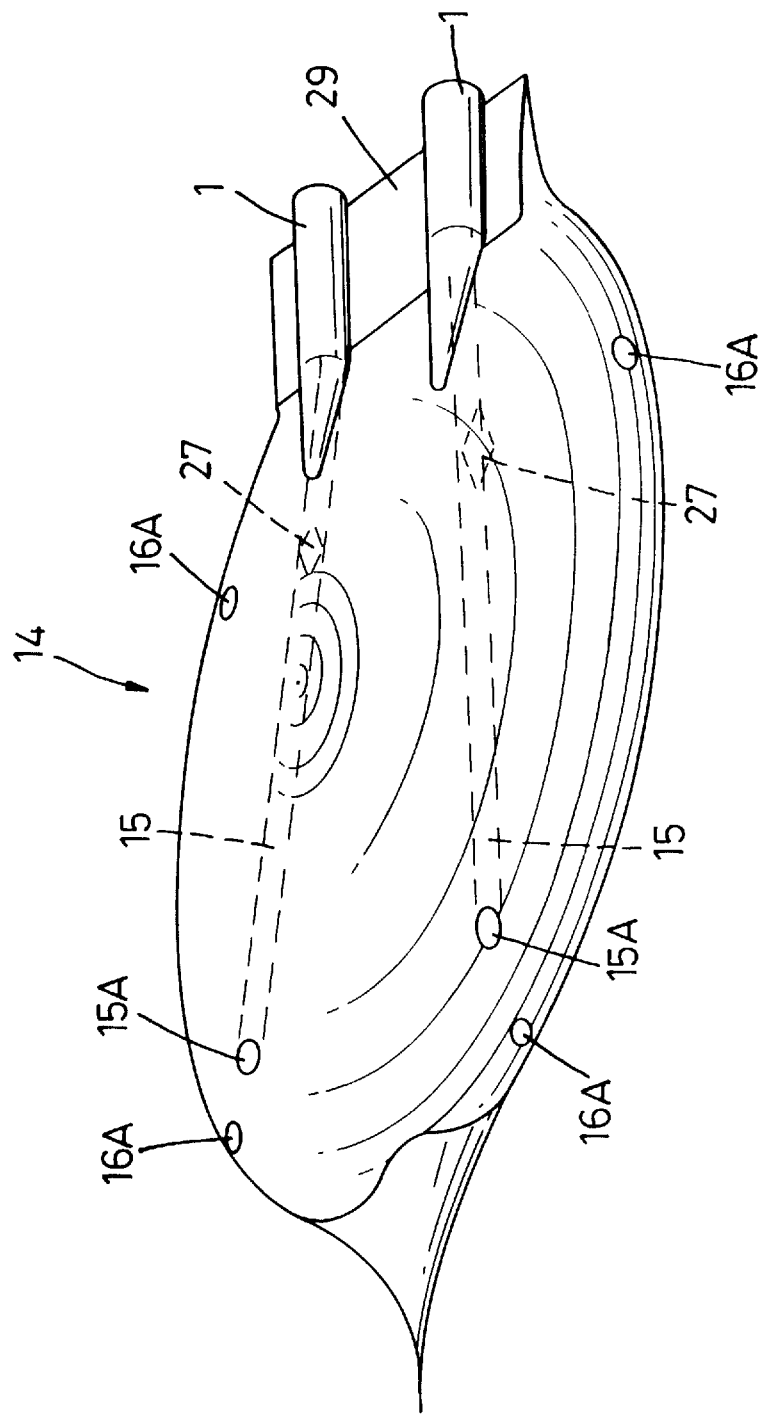
FIG. 3 shows a pictorial view of a dished form aircraft embodying the present invention.
Figure 4:
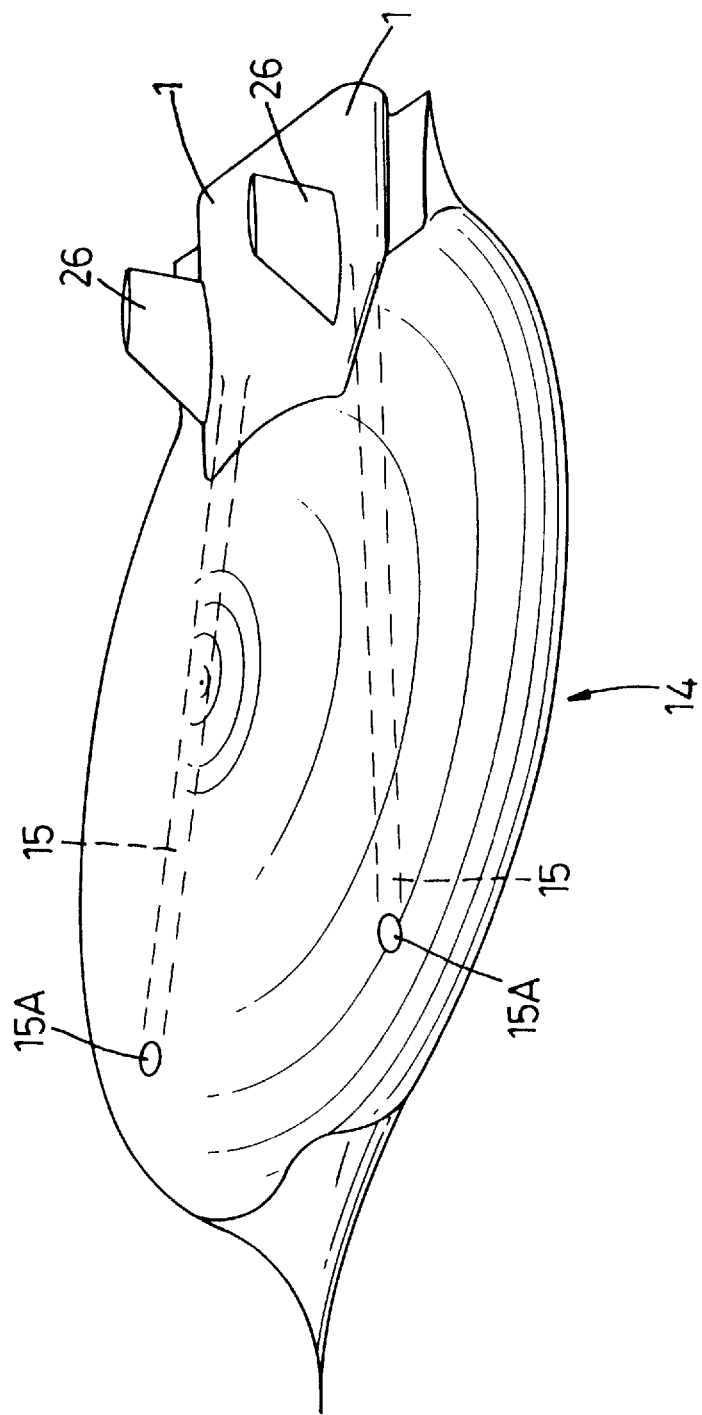
FIGS. 4 & 5 show a further such aircraft according to further embodiments.
Figure 5:
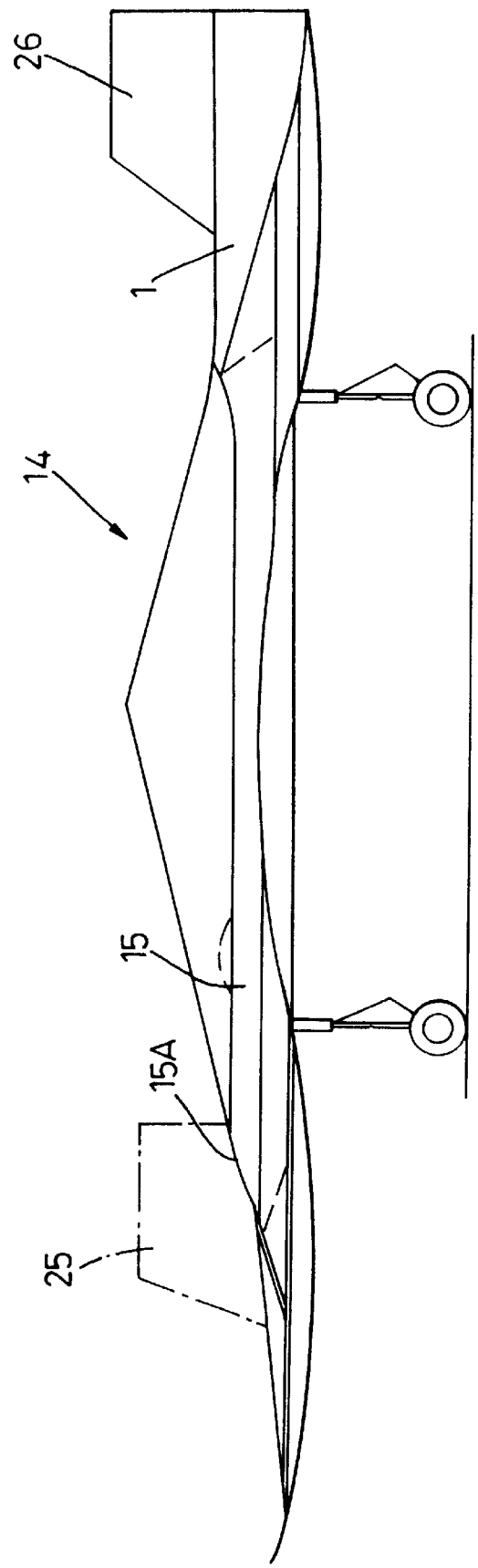

FIGS. 3 and 4 show dish-shaped aircraft 14 essentially as shown in GB patent specification 2 227 469 B. The aircraft 14 can be provided with engines 1 in accordance with either FIG. 1 or FIG. 6. Further, vent ducts 15 extend internally within the aircraft-fuselage to pass cooling medium i.e. air around the periphery of the engines for cooling of the engines and this air could also serve as combustion air for the engine. In particular the front end 15A of the vent duct 15 opens externally the top surface of the fuselage. Consequently air can enter the ducts on top of the craft and be passed around the outside of the engine 1, on forward movement of the craft 1, to cool the engines. This arrangement can also serve to pressurise fuel delivering to the engines, and similarly air can be pumped to the engines from the ducts 15. Booster jets 16A may also be provided. The engines 1 can be located almost wholly within the aircraft fuselage as shown in FIG. 5, so that the aircraft 14 can enjoy an extremely low drag factor e.g. 0.02 or even less.

Figure 7:
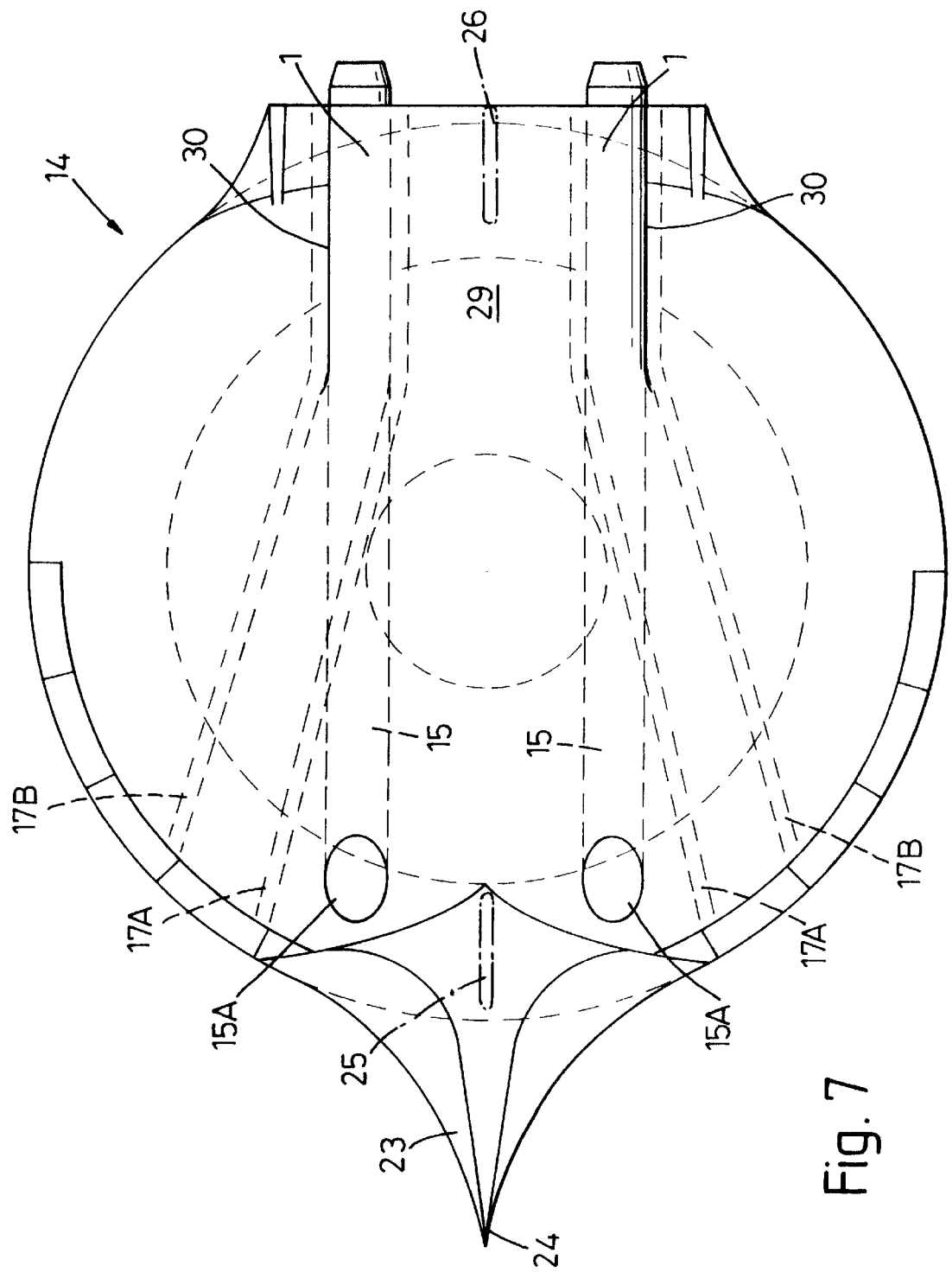
FIG. 7 is a plan view of the flying craft.

FIGS. 7 to 9 show further views of the flying craft 14, in particular the straight main ducts 15 through the fuselage are present, extending from openings 15A at the front portion of the craft 14 to the engines 1 at the rear of the craft 14 to provide cooling air for example surrounding the engines and/or combustion air for the engines 1. Further ducts 17A, 17B could be present alternatively or additionally again extending through the fuselage to provide air for the engine 1, the ducts 17A, 17B which can be of smaller diameter than the ducts 15 this time having their front opening at the leading edge of the flying craft 14. Pumping means could be present for increased air flow through the various ducts 15, 17A/B.

Considering now the aerodynamic form of the craft 14. The flying craft 14 has a domed upper surface 18 of continuous sheeting forming a series of annular portions 19 each of a gently bowed form in the radial direction but maintaining an upper surface which is smoothly contoured.

To provide the slender body form the domed upper surface 18 can have a gently rising gradient for example in the order of 16%. The underside is also smoothly contoured and comprises a central concave wall 20 and a second surface 21 surrounding the wall 20: in a preferred embodiment the wall 21 is of convex form as shown. The edge of the dish comprises an upturned flange 22 (as seen in FIGS. 8/9), while a streamlined proboscis 23 is located at the front of the craft and includes an upturned tip 24. The proboscis 23 serves to prevent undesirable yawing of the flying craft in flight and encourages longitudinal stability. In addition a fin 25, 26 could be provided at the front and/or the rear for directional stability or controlability. A retractable undercarriage including wheels 27 carried by hydraulic struts 28 facilitates clear landing and take-off of the flying craft. The top 18 and bottom 20/21 walls of the flying craft can be carried by a suitable internal support structure (not shown).

The flying craft 14 is constructed from suitable material for example aluminium or titanium, especially the latter where very high altitude or space flight is intended. Further, an appropriate coating may be applied to the surface skins, for example carbon fibre paint, particularly to enable the flying craft to withstand heat at very high speed flight (e.g. 4 to 10 MKS per hour).

The shape of the flying craft dish will result in a very low drag characteristic enabling the craft to cut through the air with ease. Also, although designed for high speed operation, flying craft 14 nevertheless will be able to descend smoothly and conveniently on landing on a runway.

The two spaced engines 1 can be seen in FIG. 8 and these are essentially located within the fuselage to encourage the presence of a low drag factor for the flying craft: thus a fuselage wall portion 29 extends between the engines 1 and blends into the top surface 18 towards the domed central portion, while the outer sides of the engines 1 are smoothly faired into the fuselage at 30. The front openings 15A for the ducts 15 to the engines 1 can be seen in FIG. 9. Turning of the craft could be achieved by a rudder 25, 26, but alternatively this turning could be achieved by controller operation of the engines 1 i.e. by increasing the thrust of one engine relative to the other. Also a rear flap could be present for air craft climbing or descent.

Directional control of the flying craft 14 can also be obtained by means of the thruster jets 16A/16B shown in FIGS. 10 and 11. Thus the jets 16A are arranged in pairs on either side of the fuselage symmetry line x—x, so that operation of the front pair raises the nose of the craft 15 for ascent while operation of the rear pair lowers the nose for craft descent. Further, banking of the craft 14 can be achieved by operation of the jets alone at the port or starboard side appropriately and the further thruster/booster jets 16B at the central line L—L can be used in this operation. The downward angle of the jets can be selected appropriately and it would be possible to provide variable discharge nozzles at any of the jets 16A, 16B to change a jet direction, for more sensitive directional control. Air could be provided for the jet producing devices of jets 16A, 16B from any of the air ducts 15, 17A/B.

The air flow in the ducts 15 can also serve to drive a double fan turbine as described in the applicants GB Patent Application No 9 507 976.0 (Publication No ), filed 19 Apr. 1995 and U.S. Ser. No. 08/425,056 filed Apr. 19, 1995 concerning electrical generating apparatus, so as to produce electrical energy for electrical energy supply requirements of the aircraft.

Figure 15:
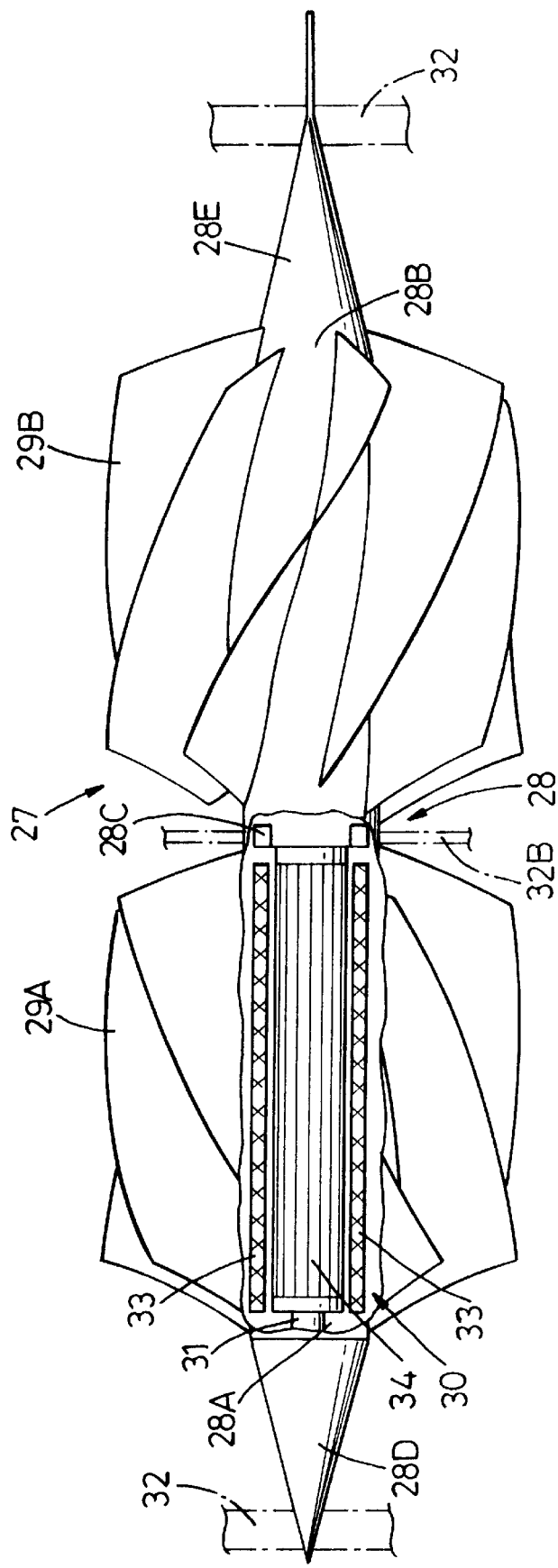
FIG. 15 shows a part sectioned elevation of a contra-rotating double-fan turbine generator usable in the invention.

FIG. 15 shows an example of this double fan turbine in greater detail. Thus turbine/alternator 27 comprises a fan drum assembly 28 carrying two sets of fan blades 29A, 29B. Each fan blade set 29A, 29B is carried by its separate hub portion 28A, 28B so that the fan sets 29A, 29B can rotate separately from each other, the drum 28 including a stationary central ring portion 28C which can support the hub portions 28A, 28B. The blades of each fan set 29A, 29B, are of elongate form with an axial length greater than the radial dimension and arranged helically on the respective hub portions so that the fan sets 29A, 29B are of opposite hand. Consequently wind flow over the fan sets 29A, 29B by the flow say in ducts 15 caused the fan sets to rotate in opposite (contra) directions. The front hub 28A includes a cone 28D with its apex forward encouraging a smooth air-flow from the duct 15 onto the turbine fan while the rear hub has a similar conical portion 28E at the rear. The fan and the alternator advantageously constitute a rotary unit defining an electrical generator. Thus, the alternator 30 comprises a central shaft 31 preferably of hollow form connected to the hub portion 28B with the hub portion 28A surrounding the shaft 31. The fan assembly can be carried by suitable supports 32 front and rear, while a radial support 32B for example in the form of rods can be provided at the central portion 28C. Both the supports 32 will be linked to stationary parts of the hub cones.

Wire coils 33 are provided on the under side of hub potion 28A to constitute the armature component of the alternator while the rotary shaft 31 carries the induction coils 34 constituting the induction component of the alternator. Exciting current to the coils for electromagnetic field production and electrical power taken off from the alternator can be achieved by appropriate means.

Figure 16:
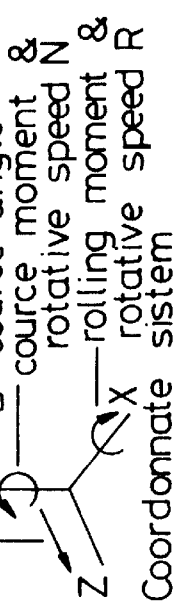
FIGS. 16 to 18 are performance graphs of the aircraft.
Figure 17:
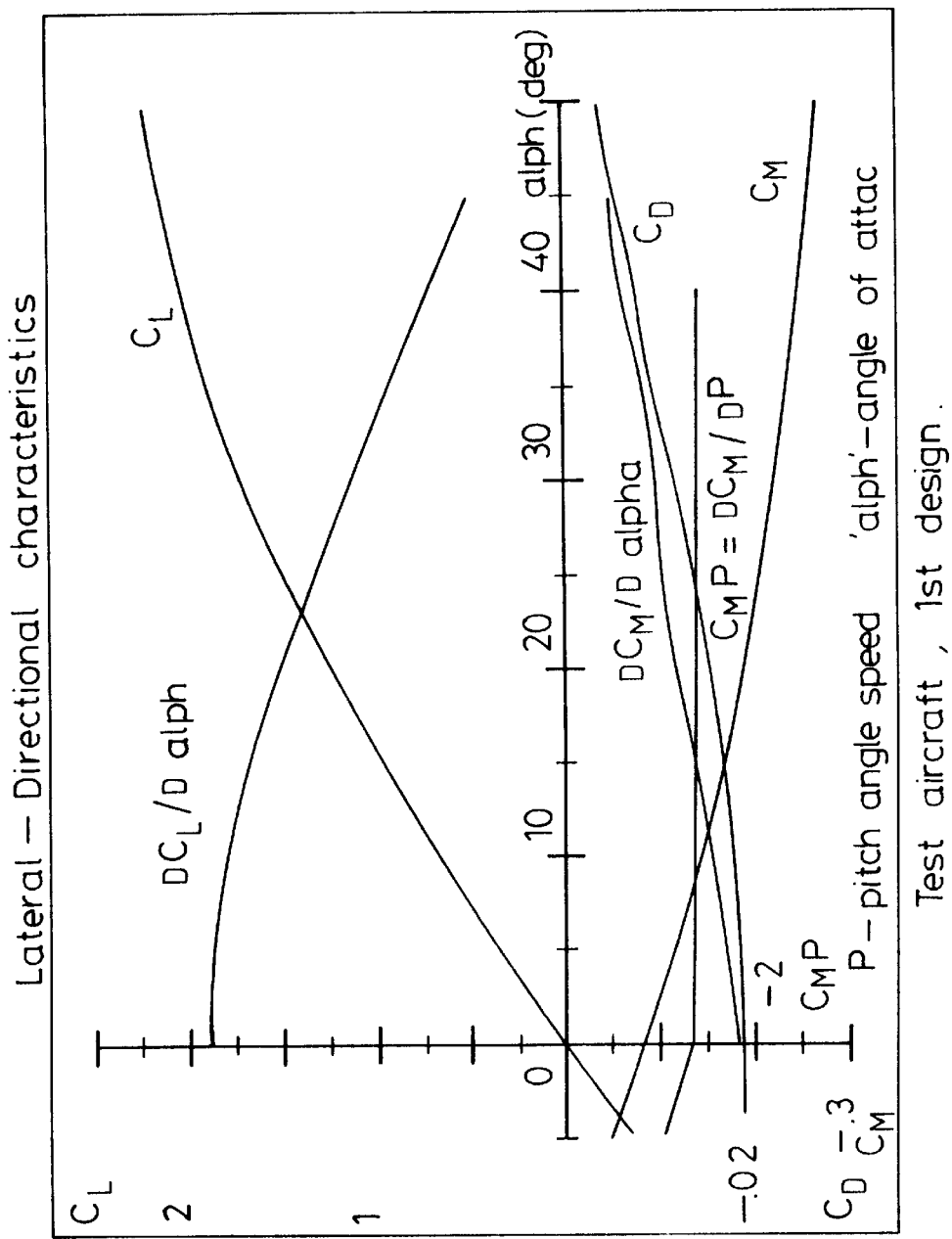
Figure 18:
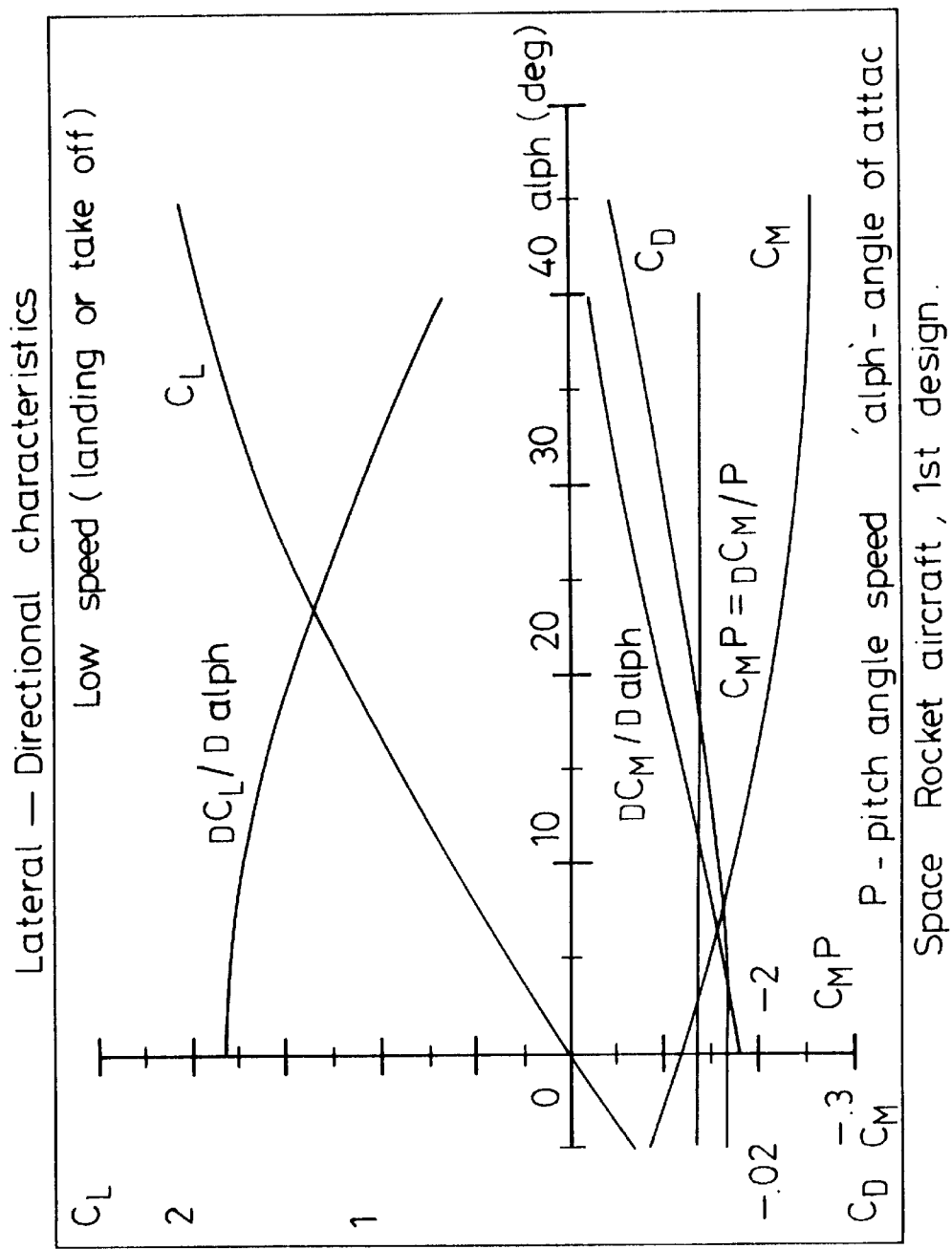

FIGS. 16 and 17 show possible performance criteria provided by the aircraft 14 (for atmospheric operation) while FIG. 18 shows a performance graph similar to FIG. 17 for the aircraft 14 as intended for use in outer space i.e. as a space craft. The low drag factor $C_D$ will be noted.

The thruster jets 16A, 16B could function to give a certain vertical take-off characteristic to the flying craft 14, and also permit a controlled vertical descent of the craft. The embodiments shown in FIGS. 12 and 13 develops this characteristic but uses a single engine 35 (or a plurality of engines) arranged vertically and of much greater power for take-off and ascent of the craft 14A essentially vertically. The flying craft 14A of FIG. 12 in fact is provided with two separate propulsion modes, namely the engine 35 for vertical motion and electrical propulsion means 36 for forward (substantially horizontal) movement. Each propulsion means 36 is located in a respective air duct 15, which can be of different diameter than previously, and in essence comprises a ducted fan propulsion means, having a turbine fan 37 coupled to an electric drive motor 38 (which may be provided with a further cooling fan). The engine 35 is shown as a jet engine having an upper air inlet 35A and a lower jet discharge 35B. Movable shutter or segment portions 39 are located on the top of the craft 14A to move over and close the air inlet 35A and provide complete surface continuity on the top of the craft when the craft operates in the second electric propulsion mode. Similar or other closure means could be provided for the discharge 35B. Instead of a jet engine 35 it would of course be possible to utilise a rocket engine, especially one of the rocket engines described previously. Zones 40 in the flying craft 14A will serve as storage spaces e.g. for power batteries for the electric motors 38 and other electrical items and/or passenger accommodation spaces. The pilot and other crew members can be located in cockpit space 41, while fuel for engine 35 can be stored in peripherial spaces 42. Thruster engines as before (16A/B) could be installed for control of the movement of the craft 14A.

Wind driven turbine alternators 27 as described previously are installed in the ducts 15 for the production of electrical power, for supply for example to the power batteries of the electric motors 38.

Referring to FIG. 14, in the proposed operation of the flying craft 14A take-off (A–B) is effected by the first power mode i.e. engine 35 and the engine power is such as to lift the craft 14A substantially vertically as can be seen by path A–B. The altitude B reached should be very substantial e.g. possibly greater than 60,000 ft and even as high as 90,000 ft for example. When the desired height (B) is attained, the engine 35 is shut-down and the inlet 35A (and outlet 35B) are closed by the shutters 39, and drive power is transferred i.e. to the second mode i.e. to electrical propulsion means 36 for movement of the craft in path B–C. The second power mode 36 will of course have very limited power compared to the engine 35 but it is intended to have a substantially soaring motion in the path B–C with very gradual descent. Forward speed attainable by the power mode 36 will be quite low e.g. 200 or 300 m.p.h., but the relatively quiet fan motors 37/38 will enable the dish-shaped craft 14A to move forward in a silent stealth like manner.

The descent can be very gradual, say 1 mile drop for every 100 mile advance, so that the range may be quite reasonable e.g. about 1800 miles from an altitude of 90,000 ft although the battery capacity will affect this range. If an increase in range is desired during forward movement, then there could be intermediate operation of the engine 35 to gain altitude to provide an increased range. A certain directional control can be achieved by varying the operation of the motors 38 to give unbalanced thrusts. The motors 38 may drive the fans 37 at speeds greater than 10,000 r.p.m. and up to 20,000 r.p.m. or more. The engine 35 can provide for controlled vertical descent.

The craft 14A may use simple skids 43 in its undercarriage instead of wheels. As will be seen in FIG. 12, the periphery of the fuselage is now downwardly carried instead of having the previous flange 22 to reduce resistance to vertical movement. Also, the first power mode could be arranged so that the take-off and ascent path is not completely vertical as shown by alternative paths $A_1B$ and $A_2B$ and this will enable a less powerful engine(s) to be used. Further, use of the first power mode could extend into the second path to give an initial boost to the motion in this path for a short distance.

Figure 12:
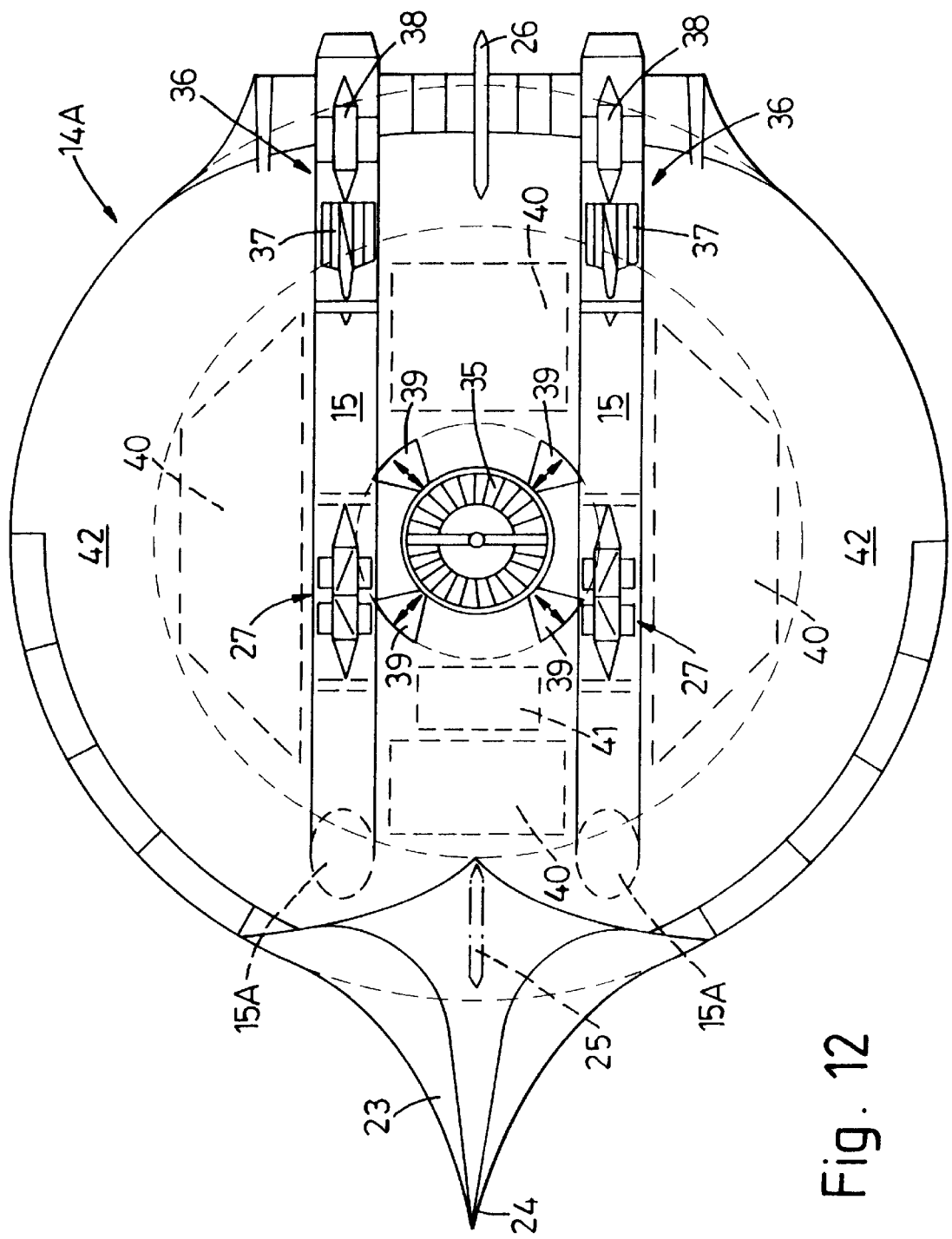
FIG. 12 is a plan view of a flying craft according to another embodiment of the present invention.

Modifications are of course possible in all the embodiments. In particular rocket engines may be replaced by jet engines or vice versa. In the emodiment of FIG. 12, the primary engine (35) could be released and ejected from the flying craft when the desired altitude (B) is attained: the engine could be fitted with parachutes for descent to the ground.

I claim:

1. A flying craft including a thruster engine, said thruster engine comprising:

casing means for housing adjacent first and second work zones, said casing means having a rear;

first delivery means for introducing a first propellant fuel into said first work zone for combustion in said first and second work zones, said first delivery means comprising:
(a) a first conical member having a surface and an apex, said apex facing said first work zone;
(b) a second conical member coaxial with said first conical member;
(c) duct means in said surface of said first conical member for the through-flow of said first propellant fuel into said first work zone; and
(d) conduit means for directing burning fuel from said first work zone to said second work zone, said conduit means being formed on said second conical body; and second delivery means for directing a second medium to said second work zone for admixture with the burning fuel, the burning fuel and the medium being discharged from said rear of said casing means to constitute a thrust jet for said engine.

2. The flying craft according to claim 1, wherein said first propellant fuel is liquid-oxygen and said second medium is liquid-hydrogen.

3. The flying craft according to claim 1, further comprising a nozzle device at said rear of said casing means.

4. A flying craft as claimed in claim 1, wherein:

the flying craft has a fuselage body of generally dished form with a domed upper surface, said fuselage body having a rear and said thruster engine being located at the rear of the fuselage body, the fuselage body has a front inlet on said upper surface, and the flying craft additionally includes an air duct extending through the fuselage body from the front inlet on said upper surface to said thruster engine to provide cooling air for said engine.

5. A flying craft as claimed in claim 4, wherein said flying craft additionally includes electrical apparatus in the form of a turbine electricity generator in said air duct, said turbine electricity generator including a plurality of electricity-producing components and a plurality of separate vaned members set for contra-rotation by impingement with air passing in the air duct, each of said vaned members being coupled to a respective one of said electricity-producing components of the turbine electricity generator.

6. A flying craft comprising:

a generally dished form body providing a lift characteristic, and having a front end and a rear end, said body further having a domed shaped upper surface and a lower surface, said domed shaped upper surface having a front part and an air inlet located in said front part of said domed upper surface;

vertically disposed first engine means located substantially at the center of said dish shaped body for providing a vertical thrust for vertically propelling said flying craft to an elevated position; and second engine means for providing propulsion power which is only sufficient to cause a forward motion of the flying craft with a slight descending path from an elevated position attained by means of the first engine means, said second engine means comprising electrically powered propulsion means for providing a horizontal thrust for propelling said flying craft in a forward direction from said elevated position, said electrically powered propulsion means comprising propulsion turbines, electrical drive means for driving said propulsion turbines, and air ductings located on either side of said first engine means and extending within said body from said air inlet to said rear end of said body, each of said ductings housing a said propulsion turbine whereby propulsion air is supplied to said propulsion turbine through the ducting.

* * * * *